United States Patent Office 3,023,187
Patented Feb. 27, 1962

3,023,187
PROCESS OF COPOLYMERIZING HEXAFLUOROPROPENE WITH VINYLIDENE FLUORIDE IN THE PRESENCE OF SILICA AND THE PRODUCT THEREOF
Elizabeth Shen Lo, Fords, N.J., assignor, by mesne assignments, to Minnesota Mining and Manufacturing Company, St. Paul, Minn., a corporation of Delaware
No Drawing. Filed Apr. 2, 1958, Ser. No. 725,804
7 Claims. (Cl. 260—41)

This invention relates to fluorine-containing polymer compositions of improved properties. In one aspect this invention relates to certain fluorine-containing resinous thermoplastics and elastomers of a fluoropropene having improved physical properties. In another aspect this invention relates to a method of preparation of such polymers having improved properties.

This application is a continuation-in-part application of my prior and co-pending application Serial No. 537,886, filed September 30, 1955.

Because of their unusual chemical and physical characteristics, fluorine-containing polymers are widely used in numerous industrial applications where their properties are best exploited. It has been found that copolymers of hexafluoropropene and vinylidene fluoride possess an outstanding combination of chemical and physical properties which make them unique and perhaps the most outstanding group of polymers within the fluorocarbon polymer field. The physical nature of the copolymers of hexafluoropropene and vinylidene fluoride may be resinous and thermoplastic or elastomeric depending to a large extent upon the particular concentration of each monomer which becomes incorporated in the polymer product during the polymerization reaction. The copolymers of hexafluoropropene and vinylidene fluoride have been found to be particularly outstanding and unique for their excellent high temperature properties, resistance to attack either through physical or chemical breakdown when exposed to powerful oxidizing and corrosive chemicals including fuming nitric acid and hydrocarbon fuels, oils and lubricants. These copolymers are also outstanding for their resistance to swell when exposed to hydraulic fluids such as ester type hydraulic fluids. In addition to such excellent chemical properties, the copolymers of hexafluoropropene and vinylidene fluoride have been found to possess outstanding physical and mechanical properties such as low torsional modulus and good tensile strength.

In spite of the excellent chemical properties and the good combination of physical and mechanical properties exhibited by copolymers of hexafluoropropene and vinylidene fluoride, it is nevertheless desirable to modify and improve certain properties of these polymers. This is particularly desirable in regard to improving the tensile strength, tear strength and degree of elongation of the elastomeric hexafluoropropene-vinylidene fluoride polymers. In the field of elastomeric polymers it is frequently desirable to admix the polymer with fillers. These fillers dilute the quantity of raw materials which are needed to fabricate end items and to a limited extent modify the physical properties of the elastomer. Precisely how fillers including the reinforcing fillers, alter the characteristics of the material in which they are blended is not known. Many observers believe that any reinforcement realized by admixture of the raw polymer with a reinforcing filler, for example, is due to a surface adsorption phenomenon. Whatever the reason for the resultant improved properties it is interesting to note that there is no basis for predicting or extrapolating observed behavior of a given material in one polymer to another. For example, clays, asbestos, etc. which do not reinforce fluorocarbon elastomeric polymers are widely used as reinforcing fillers in other elastomeric systems. Not only may a filler fail to modify a particular polymer to any significant or appreciable extent but it may have a deleterious effect on the desirable chemical, physical or mechanical properties of the polymer system notwithstanding the fact that the particular filler may improve the properties of another different polymer system. Another factor from which there is no basis for predicting or extrapolating observed behavior of a given material in one polymer to another is the method by which the filler is incorporated into the polymer.

It is an object of this invention to provide a method for improving the properties of polymers of a fluoropropene and vinylidene fluoride.

It is another object of this invention to provide a hexafluoropropene/vinylidene fluoride polymer composition of improved physical characteristics.

It is another object of this invention to provide materials which alter the physical characteristics of fluoropropene/vinylidene fluoride polymers and to provide a process of incorporating the material into the polymer so that the material exerts a maximum degree of improvement.

It is another object of this invention to improve the physical properties of copolymers of hexafluoropropene and vinylidene fluoride without a deleterious effect on the desirable chemical properties of the polymer.

It is a further object of this invention to improve the tensile strength of the elastomeric copolymers of hexafluoropropene and vinylidene fluoride.

It is a still further object of this invention to improve the tear strength of the elastomeric copolymers of hexafluoropropene and vinylidene fluoride.

A still further object is to provide a process for obtaining the above-indicated improvements in polymers of hexafluoropropene and vinylidene fluoride without deleteriously effecting the desirable chemical and other properties of the polymers.

Various other objects and advantages of this invention will become apparent to those skilled in the art from the accompanying description and disclosure.

Accordingly, the above objects are accomplished by polymerizing fluoropropene and vinylidene fluoride in the presence of a siliceous material as one of the ingredients of the polymerization reaction system. The siliceous material employed as an ingredient of the polymerization system is an adsorptive silica which may be in uncombined or combined form. The process of this invention has particularly profound effects on the properties and especially on the physical and mechanical properties of copolymers of hexafluoropropene and vinylidene fluoride. When hexafluoropropene and vinylidene fluoride are copolymerized in the presence of one of the adsorptive silicas of this invention, the tensile strength, tear strength, etc. of the resultant polymer products are significantly greater than such properties of the polymer prepared in the absence of the silica. Further the polymers produced in accordance with this invention also possess improved properties such as greater tensile strength than the polymers produced in the absence of the adsorptive silica but to which the silica has been added by admixture after the copolymer has been prepared. The improvement in the physical and mechanical properties realized by the process of this invention are attained without any deleterious effect on the outstanding chemical and other properties of the copolymer of hexafluoropropene and vinylidene fluoride.

The tensile strength of the raw elastomeric copolymers of hexafluoropropene and vinylidene fluoride prepared prior to this invention and in the absence of the silica materials of this invention have tensile strengths of the order of between about 500 and about 1200 pounds per square inch (p.s.i.). By preparing copolymers of hexafluoropropene and vinylidene fluoride in accordance with the process of this invention elastomers are obtained having tensile strengths, prior to vulcanization, of at least about 1500 p.s.i. and as high as 2000 to 3000 p.s.i. Generally speaking, the copolymerization of a particular monomer mixture of hexafluoropropene and vinylidene fluoride in the presence of one of the silicas employed in accordance with this invention leads to a copolymer product having a tensile strength that is greater by a degree of between about 25 to 100 percent or higher than the tensile strength of the products produced from the same particular monomer mixture but in the absence of silica, all other factors being substantially the same.

As indicated above, the siliceous material which is employed as an ingredient of the polymerization reaction system may be in combined or uncombined form and is an adsorptive or porous type siliceous material as distinguished from a non-porous or non-adsorptive siliceous material such as mica or glass wool. The silica can be naturally occurring or it can be prepared by standard precipitation processes or by oxidation of silicon tetrachloride. Anhydrous silica and silica gel can be employed although no particular advantage results from the use of the more expensive anhydrous silica. The silica can be subjected to various refining processes, e.g. acid extraction, which increases its purity. In this connection, it should be noted that relatively impure grades of silica can be employed provided that the impurities do not exceed about 25 percent by weight based on the silica. Impurities which are normally present in silica, include metal oxides, such as calcium oxide, aluminum oxide, iron oxide and salts, such as sodium sulfate and sodium chloride. Other impurities can also be present provided that they do not inhibit polymerization or cause degradation of the polymer product.

The free silica, described above, can be combined with a variety of organic materials which enhance the organophilic properties, and in some instances the hydrophobic properties, of the silica. Included among the combined silicas are the silicone coated silicas. These silicone coated silicas are prepared by treating silica gel with a solution of silicone polymer, preferably normally liquid, in a suitable solvent, such as lower alcohols, ketones, etc. When silica is treated in this manner, a physical bond is believed to be developed between the silica and the silicone polymer. The silicone polymers which can be employed, are those homopolymers in which the siloxane units are $(CH_3)_2SiO$ or $(CH_3)C_6H_5SiO$. The copolymer siloxanes may contain any combination of the above units and in addition may contain small amounts of $(C_6H_5)_2SiO$, etc. Other silicone polymers can be employed although the above enumerated are preferred. In addition to coating the silica as described above, the silica can be chemically bonded to organophilic materials. To provide a chemically bonded silicone coated silica surface, a halosilane or an amino silane is polymerized in the presence of the finely divided silica gel. In addition to the silicone coated silicas, a class of compounds known as the Estersils can be employed. The Estersils are prepared by reacting an alcohol with silica. The precise mechanism is not known but it is believed that the alcohol reacts with siliceous acid $(H_2SiO_3)$ so as to form the corresponding esterified silica. The alcohols with which the silica is esterified, are the aliphatic alcohols having from 2 to about 18 carbon atoms and preferably from 3 to about 12 carbon atoms. While polyhydric alcohols can be employed, the primary and secondary monohydric alcohols are preferred. Typical of the alcohols which can be employed are primary and secondary monohydric alcohols, such as ethyl, n-propyl, n-butyl, n-amyl, n-hexyl, n-heptyl, n-octyl, n-nonyl, n-decyl, n-undecyl, n-dodecyl, etc., alcohols; branched chain primary alcohols, such as isobutyl and isoamyl alcohols; secondary alcohols such as isopropyl and sec-butyl alcohols and the alicyclic alcohols such as cyclopentanol and cyclohexanol. The quantity of the organophilic compound employed should be sufficient to provide a layer, usually monomolecular, on at least 25 percent of the surface of the silica and preferably on at least 50 percent of the surface. Detailed descriptions of the methods of preparing any of the aforesaid silicas can be found in the literature.

Irrespective of the type of silica employed, the silica should be in finely divided or dispersed form. The particle size of the silica preferably should not exceed 20 microns and is more preferably below about 10 microns in order to secure maximum improvement in the hexafluoropropene/vinylidene fluoride polymer products. For a given type of silica maximum improvement is attained with the finest particles size used. The concentration of silica added to the polymerization reaction system of this invention may vary over a relatively wide range such as between about 2 and about 30 parts per 100 parts of total monomers employed and is preferably used in an amount of between about 5 and about 20 parts per 100 parts of total monomers employed.

The reasons for the marked improvement in the tensile strength of hexafluoropropene-vinylidene fluoride copolymers of this invention realized by the presence of finely dispersed silica in the polymerization reaction medium is not clearly understood. The effect of the silica may result from a molecular mixing of the monomers and silica. The silica may become incorporated within the polymer lattices in some intricate manner during the growth of the polymer chains. Whatever the true reason or reasons may be in this connection, the fact remains that the improvement realized by the process of this invention is not realized by mere admixture of the polymer itself with silica.

The polymers of the present invention contain hexafluoropropene and vinylidene fluoride in varying comonomer ratios. The particular composition of the polymer products obtained in any particular polymerization reaction of these two monomers depends to a large extent upon the composition of the monomer mixture initially charged to the reaction zone with the silica, and the reaction conditions employed to effect polymerization. In carrying out the polymerization reaction between hexafluoropropene and vinylidene fluoride to produce the copolymers of the present invention, it has been indicated that the finished copolymers containing between about 1 and about 60 mol percent of combined hexafluoropropene, with vinylidene fluoride as the remaining major constituent, possess outstanding thermal stability and resistance to degradation or swell when exposed to fuming nitric acid, hydraulic ester fluids, and aromatic and aliphatic oils and fuels. The process of this invention is especially effective in improving the tensile strength of polymers containing at least 10, and preferably at least 15 mol percent of the hexafluoropropene monomer unit. The polymers containing between about 6 and about 60 mol percent of hexafluoropropene and between about 40 and about 94 mol percent of vinylidene fluoride have varying degrees of elasticity at room temperature. Of these copolymers those containing at least 15 mol percent of combined hexafluoropropene are completely amorphous and are particularly outstanding for their low torsional modulus and retention of their rubbery properties over a wide range of temperatures, i.e. between about −30° F. and about 600° F. without embrittlement, degradation or hardening, and high tensile strength which is realized by the process of this invention. Although the polymers containing between about 6 and about 15 mol percent of combined hexafluoropropene possess some degree of elasticity, they are somewhat more crystalline and harder rubbers than those containing at least 15 mol percent of hexafluoropropene. The copolymers containing between about 1 and about 6 mol percent of hexafluoropropene are normally resinous thermoplastic materials at room temperature and also retain their flexibility over a wide range of temperatures without embrittlement.

The polymers of the present invention are prepared by employing an initial monomer charge or feed stock containing between about 5 and about 95 mol percent and preferably less than 80 mol percent, of hexafluoropropene, the remaining major monomeric constituent of the monomer charge being vinylidene fluoride. An initial monomer charge containing between about 20 and about 70 mol percent of hexafluoropropene, in the monomer charge, leads to good yields of the particularly preferred elastomers of the present invention, i.e. the elastomers containing between about 15 and about 55 mol percent of combined hexafluoropropene. An initial monomer charge containing between about 5 and about 10 mol percent of hexafluoropropene leads to the production of resinous thermoplastic materials having between about 1 and about 6 mol percent of combined hexafluoropropene. When an initial monomer charge containing between about 10 and about 20 mol percent of hexafluoropropene is employed, the harder and less snappy elastomers are obtained, that is, those containing between about 6 and about 15 mol percent of combined hexafluoropropene, the remaining major constituent being vinylidene fluoride.

It is within the scope of the present invention to include in the monomer charge of hexafluoropropene and vinylidene fluoride, a minor proportion, usually less than about 15 mol percent, of a third monomer which is preferably a polymerizable ethylenically unsaturated halogen substituted organic compound such as fluoro-1,3-dienes (e.g. 1,1,3-trifluorobutadiene) and halogen substituted vinyl and allyl ethers (e.g. 1,1,2,2-tetrafluoroethyl vinyl ether and 2,2,2-trifluoroethyl allyl ether), to produce useful terpolymers. The presence of a third monomer improves the low temperature flexibility of the polymer without significantly sacrificing any of the desirable properties of the hexafluoropropene-vinylidene fluoride polymers of the present invention.

In addition to one of the aforesaid silicas the polymerization system employed to copolymerize hexafluoropropene with vinylidene fluoride also contains a polymerization promoter which may be a free radical forming or an ionic type promoter. The free radical forming promoters or initiators comprise the organic and inorganic peroxy and azo compounds. The ionic initiators comprise inorganic halides of the Friedel-Crafts catalyst type, and mineral acids. The initiator is generally employed in an amount between about 0.001 and about 5 parts by weight per 100 parts of total monomers employed, and preferably are employed in an amount of between about 0.01 and about 1.0 parts by weight.

The polymerization catalyst system may be aqueous or non-aqueous. Of the aqueous systems the emulsion polymerization systems are preferred since such systems lead to good yields of high molecular weight copolymers of hexafluoropropene and vinylidene fluoride having the desirable properties herein described. Activators, accelerators and buffers also may be included as ingredients of the aqueous systems, as desired.

The different types of aqueous emulsion systems may be conveniently differentiated on the basis of the promoter employed to initiate the copolymerization reaction. For example, one type of aqueous emulsion system is that in which an organic peroxide, which is preferably a water soluble peroxide, is employed as the initiator and a second type is that in which an inorganic peroxy compound is employed as the initiator. Exemplary of the organic peroxides or oxidants which are particularly preferred as the initiators in an aqueous emulsion system are cumene hydroperoxide, diisopropyl benzene hydroperoxide, triisopropyl benzene hydroperoxide, tertiary-butyl hydroperoxide, tertiary-butyl perbenzoate and methyl cyclohexane hydroperoxide.

A second type of suitable aqueous emulsion polymerization system is that in which the promoter or initiator is one of the group of water soluble inorganic peroxides such as the perborates, persulfates, perphosphates, percarbonates, barium peroxide, zinc peroxide and hydrogen peroxide. Particularly effective inorganic peroxides are the water soluble salts of the peracids such as the sodium, potassium, calcium, barium and ammonium salts of the persulfuric and perphosphoric acids such as potassium persulfate and sodium perphosphate.

The emulsifier which is employed in the aqueous emulsion systems comprise the inorganic derivatives derived from aliphatic carboxylic acids including both the unsubstituted hydrocarbon and halogen-substituted aliphatic carboxylic acids. The nonhalogenated hydrocarbon type of emulsifiers or soaps comprise the metal salt derivatives such as the potassium and sodium salts derived from hydrocarbon aliphatic acids having an optimum chain length between about 14 and about 20 carbon atoms per molecule and are typically exemplified by potassium stearate, sodium oleate and potassium palmitate, and any mixture thereof.

The preferred emulsifiers are the halogen-substituted carboxylic acids which are at least half fluorinated and which have between about 4 and about 20 carbon atoms per molecule. The particularly preferred halogen-substituted emulsifiers are the perfluorochlorocarboxylic acids having at least two fluorine atoms for every chlorine atom and the perfluorocarboxylic acids, said halogen-substituted emulsifiers having between about 6 and about 14 carbon atoms per molecule. These preferred emulsifiers are produced by a variety of procedures. One procedure involves the potassium permanganate oxidation of a perhalogenated olefin which is at least half fluorinated and which is the product of thermal cracking of high molecular weight homopolymers or copolymers of perfluoro and/or perfluorochloroolefins. This oxidation is generally carried out in a basic medium at a temperature which is preferably a sub-zero temperature such as −10° C.

A second procedure involves treating with fuming sulfuric acid, the telomer product obtained by telomerizing an olefin which is at least half fluorinated such as trifluorochloroethylene, in the presence of a bromohalomethane or a sulfuryl halide as the telogen. Such telomer products are prepared by reacting the olefin and telogen in the presence of a promoter such as benzoyl peroxide at a temperature between about 75° C. and about 210° C. in the presence or absence of sulfur dioxide.

When trifluorochloroethylene is telomerized with a bromohalomethane such as bromotrichloromethane, or with a sulfuryl halide such as sulfuryl chloride, the telomeric products are represented by the following general formulas, respectively:

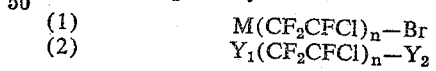
(1)            $M(CF_2CFCl)_n-Br$
(2)            $Y_1(CF_2CFCl)_n-Y_2$ wherein M is a perhalomethyl radical having a total atomic weight not higher than 146.5, $n$ is an integer from 2 to 10, $Y_1$ is a halogen selected from the group consisting of fluorine, chlorine, and bromine, and $Y_2$ is a halogen selected from the group consisting of chlorine and bromine. The hydrolysis of these telomers in fuming sulfuric acid at a temperature between about 140° C. and about 210° C. leads to the production of organic perfluorochlorocarboxylic acids having the recurring

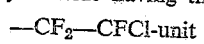
—$CF_2$—$CFCl$-unit or at least two fluorine atoms for every chlorine atom. Further details regarding the hydrolysis of these telomers to corresponding fluorochlorocarboxylic acids can be found in U.S. Patent Numbers 2,806,865 and 2,806,866 issued on April 17, 1957. These acids react readily with alkali metal, alkaline earth metal and other metal hydroxides, carbonates and other such basic compounds to produce the corresponding metal salt derivatives.

Typical examples of the preferred emulsifiers to be used are the alkaline metal and other metal and ammonium salts of the fluorochlorocarboxylic acids described above such as the sodium, potassium and ammonium salts of 3,5,6-trichlorooctafluorohexanoic acid and 3,5,7,8-tetrachloroundecafluorooctanoic acid. Other halogenated emulsifiers which may be used in the process of this invention are the ammonium, potassium and sodium salts of perfluorohexanoic acid, perfluorooctanoic acid and the various derivatives of the organic polycarboxylic acids disclosed in U.S. Patent Number 2,559,752 as being efficacious dispersing agents in polymerization reactions.

The emulsifier is generally employed in a quantity between about 0.2 and about 10.0 parts by weight per 100 parts of total monomers charged, and preferably between about 0.5 and 5.0 parts by weight are used.

Activators which are often used in conjunction with the peroxy compound comprise sodium bisulfite, sodium metabisulfite, sodium thiosulfate, sodium hydrosulfate, a reducing sugar such as dextrose and levulose and, in general, any water soluble reducing agent. Such activators are generally employed in an amount between about 0.2 and about 0.8 part by weight per 100 parts of total monomer employed.

Accelerators which may be employed in the aqueous polymerization systems comprise water soluble variable valence metal salts of sulfate, nitrates, phosphates, and chlorides such as cuprous sulfate, ferrous sulfate and silver nitrate. Such compounds are generally employed in an amout between about 0.01 and about 1.0 part per 100 parts of total monomer employed, and preferably in an amount between about 0.05 and 0.5 part by weight. When an activator such as sodium metabisulfite and an accelerator such as ferrous sulfate are employed, the catalyst system is referred to as a redox system. The above-mentioned organic peroxides are preferably employed in such a redox system.

Although the pH of the polymerization system may be between about 2 and about 10, it has been found that best results are obtained in an aqueous system when the hexafluoropropene and vinylidene fluoride are copolymerized at a pH between about 4 and about 8. Appropriate pH conditions are maintained by the addition of a buffer as an ingredient of the polymerization catalyst system. Such buffers comprise disodium hydrogen phosphate and sodium metaborate. When the emulsifier is charged to the polymerization zone as a free acid such as perfluorooctanoic acid, it is best to employ a buffer such as disodium hydrogen phosphate and to maintain the pH of the system within the preferred range, that is, between about 4 and about 8.

As indicated above, the polymerization process of the present invention also may be carried in a non-aqueous mass or bulk polymerization system comprising a free radical forming promoter such as the organic peroxy compounds and azo compounds, or an ionic promoter. The organic peroxides which may be used include the aliphatic and aromatic peroxy compounds as well as the fluorine and chlorine substituted organic peroxides. Exemplary of suitable aliphatic peroxides are diacetyl peroxide, lauroyl peroxide, tertiary-butyl peroxide, caprylyl peroxide, trichloroacetyl peroxide, perfluoropropionyl peroxide, 3-carboxy propionyl peroxide, 3,4-dibromobutyryl peroxide, trifluoroacetyl peroxide, difluoroacetyl peroxide and perfluorononanoyl peroxide. Exemplary of the suitable aromatic peroxides are benzoyl peroxide, p-nitrobenzoyl peroxide and 2,4-dichlorobenzoyl peroxide. Exemplary of the azo compounds which may be employed are alpha, alpha-azo-isobutyronitrile, alpha, alpha-azo-methylnitrile and alpha, alpha-azo ethylnitrile. Exemplary of suitable ionic initiators which may be employed in the mass type polymerization system are Friedel-Crafts type catalysts such as boron trifluoride, aluminum trichloride, stannic chloride, ferric chloride, titanium tetrachloride and phosphorus pentachloride; and mineral acids such as sulfuric acid and phosphoric acid.

The polymerization process of the present invention also may be effected in the presence of an organic solvent inof this kind are hydrocarbon solvents such as hexane, isooctane, and cyclohexane; aromatic solvents such as benzene and toluene; certain oxygenated solvents such as dioxane and tetrahydrofuran; and preferably fluorochlorocarbon solvents such as fluorotrichloromethane (Freon-11).

As indicated previously, the copolymerization process of the present invention is generally conducted at a temperature between about 0° C. and 150° C. Particularly good results are obtained when the temperature of copolymerization is maintained between about 25° C. and about 100° C. especially when the above-described preferred aqueous emulsion polymerization catalyst system is employed.

The polymerization process hereindescribed may be carried out at pressures ranging from about atmospheric pressure to pressures as high as 500 atmospheres which pressures may be autogenous or superimposed pressures. The interpolymerization of the hexafluoropropene and vinylidene fluoride in the presence of silica is conveniently conducted under autogenous pressure which generally corresponds approximately to the pressure exerted by the vinylidene fluoride monomer and in general this pressure does not exceed about 160 atmospheres. Higher pressures are obtained by the use of special high pressure equipment, if necessary, and an inert gas such as nitrogen to obtain the desired elevated pressure.

Although the polymerization process of this invention may be conducted under autogenous pressure, it has been found that higher conversions of monomer to polymer are obtained and that the molecular weight of the product is more readily controlled by continuously charging a mixture of the hexafluoropropene and vinylidene fluoride to a polymerization zone containing the catalyst system and silica while maintaining a constant pressure in the polymerization zone which pressure is preferably below the pressure at which the hexafluoropropene or vinylidene fluoride monomers begin to condense at the particular reaction temperature. Thus, in accordance with this embodiment of the present invention a suitable polymerization vessel is charged with one of the aforesaid aqueous catalyst solutions and silica, evacuated and connected to a cylinder containing the particular monomer mixture which is to be copolymerized, the cylinder being connected to the polymerization vessel by means of a needle valve attached thereon or any other such mechanism. The monomer mixture feed is then introduced into the polymerization vessel through the needle valve at a controlled rate sufficient to maintain the pressure of polymerization at the desired constant value which as indicated above is preferably below the saturation pressure of the particular monomer mixture to be copolymerized. In conducting the copolymerization of hexafluoropropene and vinylidene fluoride in accordance with this embodiment of the present invention the pressure is maintained constant within the range between about 75 and about 275 pounds per square inch gage (p.s.i.g.) and is preferably maintained between about 120 and about 250 p.s.i.g. when operating within the aforesaid polymerization reaction temperatures.

The presently described process may be effected over a relatively wide range of reaction time such as between about 0.5 hour and about 100 hours but in general good results are obtained between about 6 and about 72 hours.

The polymerization reaction can be carried out in a batchwise or continuous manner as desired. In conducting the polymerization in a continuous manner a mixture of the monomers is passed continuously through a zone which is maintained at reaction conditions and which can be provided with stirrers or other means of agitation. Alternatively, the catalyst can be injected into the system which is passing through the reaction zone.

The improved hexafluoropropene-vinylidene fluoride copolymers of the present invention are suitable and useor fabric surfaces. The copolymers are dissolved in a suitable solvent and applied to the surfaces by spraying, brushing, or other such conventional coating techniques. Particularly useful solvents for this purpose comprise the relatively low molecular weight and volatile aliphatic carboxylic acid esters such as methyl acetate, ethyl acetate, and butyl acetate. It has been found that the copolymers of the present invention are only partially soluble in organic ketones such as acetone, methyl ethyl ketone and isobutyl ketone when treated with these solvents for 4 hours at 100° F. In this respect it should be noted that it is often desirable to reduce the molecular weight of the finished polymers of the present invention in order to obtain greater solubility in the more volatile organic solvents such as the ketones and to obtain increased softness in the rubbery characteristics of the elastomers, which may sometimes be desirable. The polymerization reactions which are carried out in the presence of the polymerization promoters of the present invention normally tend to form very high molecular weight copolymer products of hexafluoropropene and vinylidene fluoride, that is, polymers having a molecular weight of at least 50,000. A reduction of the strength of the recipe or polymerization promoter merely slows the rate of reaction without appreciably affecting the molecular weight of the finished copolymer. It has been found, however, that the addition of various polymerization modifiers appreciably reduces the molecular weight of the copolymer products and increases their solubility without affecting unduly the over-all yield. Suitable polymerization modifiers include chloroform, 1,1,2-trichlorotrifluoroethane (Freon 113), carbon tetrachloride, bromotrichloromethane, trichloroacetyl chloride and dodecyl mercaptan. These polymerization modifiers are preferably added in amounts between about 1 and about 10 parts by weight per 100 parts of total hexafluoropropene and vinylidene fluoride charged to the polymerization zone.

The hexafluoropropene/vinylidene fluoride copolymers prepared in the presence of one of the aforesaid silicas are susceptible to cross-linking or vulcanization. Curing or cross-linking of the copolymer is effected by incorporating within the copolymer a cross-linking agent which can be a peroxy type compound, a polyfunctional amino compound or a precursor of a polyfunctional amino compound. The peroxy type compounds include both organic and inorganic compounds which contain oxygen atoms directly linked to oxygen atoms and should be stable below about 50° C. in order to avoid cross-linking during the blending operation. Among the organic peroxy compounds are the acyl and aroyl peroxides, and hydroperoxides, such as ditertiary butyl peroxide, dilauryl peroxide, dibenzoyl peroxide and ditertiary butyl hydroperoxide. The organic peroxy type compounds also include peresters having either organic or inorganic peroxy oxygen. The former would include such compounds as alkyl and aryl perbenzoates, while the latter would include alkyl and aryl persulfates. Among the inorganic peroxy compounds, are hydrogen and metal peroxides, such as lead, barium and zinc peroxide. Among the polyfunctional amine compounds which may be used as cross-linking agents, are ethylene diamine, diethylene triamine, triethylene tetramine, tetraethylene pentamine, hexamethylene diamine, piperazine, 1,5-naphthalene diamine, diaminoanisole, diaminobenzoic acid (all isomers), diamino stilbene (all isomers), diaminotriphenylmethane, triaminotriphenylmethane, diaminophenol (all isomers), tetramino 3,3-dimethyl-diphenyl-methane, diaminobenzene (all isomers), triaminobenzene (all isomers) triaminobenzoic acid (all isomers), triaminophenol, 1,2-propylenediamine, 1,2,3-triaminopropane, etc. Among the precursors of amines, are the polyisocyanates, polyisoamine, polyamine salts, polyureas, polycarbamyl halides and polyurethanes. Precursors of amines are compounds which by their own decomposition or by reaction with other materials under curing conditions, produce polyamines. Preferred amines are the primary aliphatic diamines.

Other examples of cross-linking agents which are suitably employed to cross-link the copolymers of this invention are the carbamic radical containing salts of acyclic primary and secondary polyamines such as, for example, the carbamic radical containing salts of tetraethylenepentamine, hexamethylene diamine, triethylenetetramine, diethylenetriamine, pentamethylenediamine, decamethylenediamine, undecamethylenediamine, N-trichloromethylpentamethylenediamine, N-phenylhexamethylenediamine, B-phenylbutylenediamine, heptamethylenediamine and homologs and isomers thereof. The preferred polyamine salt derivatives containing a carbamic radical are those which decompose at an elevated temperature to produce primary acyclic diamines.

The curing or cross-linking agent is used in a concentration between about 0.5 and about 20 parts by weight preferably between about 3 and about 15 parts by weight based on 100 parts by weight of polymer.

In cross-linking the polymers of this invention, it is preferred to incorporate in addition to the above-described cross-linking agents, basic metal compounds which react as accelerators. Among the basic metal compounds which can be employed as accelerators, are the basic metal oxides, such as magnesium oxide, zinc oxide and lead oxide and additionally, in the case of peroxide cured recipes, the basic lead salts, such as dibasic lead phosphite, tribasic lead sulfate and tribasic lead maleate. Where basic lead salts are used, they are preferably used in combination with basic metal oxides since a synergistic effect appears to result from the combination. The precise mechanism of the acceleration is not known. The concentration of the basic metal compound will vary from about 0.5 to about 30 parts by weight and preferably from about 1 to about 20 parts by weight for each 100 parts of polymer.

It is to be understood that fillers may be added to the hexafluoropropene/vinylidene fluoride copolymers prepared in accordance with this invention to improve molding characteristics and to further modify the physical properties of these copolymers. They are, therefore, regarded as additives. When a filler is employed, it is usually added to the vulcanization recipe in an amount between about 0.5 and about 15 parts by weight preferably between about 1 and about 15 parts by weight per 100 parts by weight of copolymer. Examples of such fillers which may be used include any of the aforesaid silicas which are used as an ingredient of the polymerization system such as synthetically refined silica such as Syton-200 silica and the like. Another type of additive which may be admixed with the copolymers of this invention to further increase modulus, tensile strength and hardness of the polymer is a high abrasion furnace carbon or carbon black such as, for example, Statex-R carbon black, Philblack O, channel black and thermal black.

In addition to the above-described additives, various other types of additives can be incorporated within the solid copolymers of hexafluoropropene and vinylidene fluoride produced in accordance with this invention. Thus, plasticizers, softeners, etc. can be added to further modify the physical properties while colored organic and inorganic pigments can be added to modify the esthetic properties.

In compounding the hexafluoropropene/vinylidene fluoride polymers produced in accordance with this invention, so as to effect cross-linking, the copolymer is mixed with suitable accelerators and curing agents. Blending of the components is carried out in suitable mechanical mixing equipment, such as two roll mills, Banbury mills and screw type plasticators. Since the mechanical blending involves shearing forces which necessarily generate heat, the cross-linking or curing agent is usually added last. In a preferred method of operation, the copolymer is introduced into the mixing equipment after which the accelerator, and additive, if desired, are added. When these have been thoroughly dispersed in the copolymer, the curing agent is added. Curing of the polymer is effected using an initial cure (e.g. press cure) between about 150° F. and about 350° F. for a period of time between about 10 minutes and about 3 hours at a pressure between about 500 and about 1500 p.s.i. followed by an after cure (e.g., oven cure) at between about 250° F. for between about 1 and about 72 hours at atmospheric pressure. In the case of peroxide cured recipes lower initial cures are preferred, e.g., between about 190° F. and about 250° F. while in the case of amine cured stock, higher cures are preferred, i.e., between about 250° F. and about 300° F. Molding can be accomplished using compression, extrusion and injection techniques.

The following examples are offered as a better understanding of this invention and are not to be construed as unnecessarily limiting thereto.

*Example 1*

(A) A stainless steel autoclave was charged with the following ingredients of an aqueous emulsion catalyst solution: 7,000 ml. of deionized water, 35 grams of potassium persulfate, 35 grams of perfluorooctanoic acid and 140 grams of disodium hydrogen phosphate heptahydrate ($NaHPO_4 \cdot 7H_2O$). The autoclave was then evacuated and connected to a steel cylinder containing a mixture of hexafluoropropene and vinylidene fluoride in an amount equivalent to 30 mol percent of the hexafluoropropene and 70 mol percent of the vinylidene fluoride. The steel cylinder containing the monomer mixture was equipped with a pressure gage and a needle valve located between the autoclave and the steel cylinder. The contents of the autoclave were then heated to 50° C. The needle valve between the steel cylinder and the polymerization autoclave was then opened and the aforesaid monomer mixture of hexafluoropropene and vinylidene fluoride was fed into the bomb at a rate sufficient to maintain the polymerization pressure at 200 pounds per square inch gage. The polymerization reaction was allowed to run for 10 hours during which time the monomer mixture of hexafluoropropene and vinylidene fluoride was fed into the autoclave at a rate sufficient to maintain the pressure within the autoclave at a constant pressure of 200 p.s.i.g. While the reaction temperature was maintained constant at about 50° C. At the end of the 10 hour period the needle valve was closed and the autoclave vented to atmospheric pressure. During the ten hour polymerization run it was found that approximately 3,929 grams of monomer mixture had reacted. The reaction mixture in the autoclave was a latex having a transparent blue appearance which was coagulated by freezing at about −70° C. in Dry-Ice chest. The solid rubbery copolymer product obtained thereby was broken into small pieces and washed about four times with cool water, followed by washing four times with hot water. The polymer was then dried to constant weight in an air oven overnight at 50° C. yielding a rubbery product (3719 grams) in 95 percent yield based on the total monomers charged to the polymerization zone. The copolymer contains approximately 30 and 70 mol percent of hexafluoropropene and vinylidene fluoride, respectively.

(B) A 100 gram aliquot of the hexafluoropropene/vinylidene fluoride elastomeric copolymer prepared in accordance with the procedure of part (A) of this example was placed on a two-roll mill and worked until a continuous band was formed. The rolls were heated to a temperature of about 60° C. to hasten the formation of the band. After the copolymer was banded, there were added thereto 1.5 grams of benzoyl peroxide, 10 grams of zinc oxide and 10 grams of Diphos ($2PbO \cdot PbHPO_3$) with cutting and turning of the copolymer as it was banded on the rolls. During the blending operation the temperature was maintained at about 100° to about 150° F. After the addition of all the ingredients the batch was thoroughly mixed on the rolls and sheeted out for the molding operation which in this case involved the preparation of standard A.S.T.M. test sheets. These test sheets were prepared by taking a sheet of stock approximately 10 percent thicker than that desired and placing it in a mold. The mold was placed in a suitable press having platens heated to 300° F. and was maintained at this temperature for a period of 30 minutes. The stock was then placed in an oven and heated to a temperature of 300° F. for a period of 16 hours. The vulcanized sample was a snappy rubber having a tensile strength of 1345 pounds per square inch, a tear strength of 123 pounds per square inch and a percent set at break of 10.

*Example 2*

A 100 gram sample of the hexafluoropropene/vinylidene fluoride raw copolymer produced in accordance with part (A) of Example 1 above was admixed with 10 grams of synthetically refined free silica ($SiO_2$) on a rubber mill. The sample was then vulcanized as described in part (B) of Example 1 above by admixing the raw copolymer containing the silica with 1.5 grams of benzoyl peroxide, 3 grams of zinc oxide and 3 grams of Diphos. The resultant admixture was then placed in a press the platens of which were maintained at a temperature of 300° F. for one-half hour. The pressed cured stock was next placed in an oven and heated at a temperature of 300° F. for a period of 16 hours. The vulcanized sample was a snappy rubber having a tensile strength of 1700 pounds per square inch.

*Example 3*

(A) After flushing a 300 ml. amico polymerization bomb with nitrogen the following ingredients were charged to the bomb freezing the contents of the bomb after the addition of each ingredient: 73 ml. of deionized water containing 3 grams of dissolved disodium hydrogen phosphate heptahydrate and 0.75 gram of perfluorooctanoic acid; 60 ml. of deionized water containing 0.75 gram of dissolved potassium persulfate; and 17 ml. of an aqueous solution containing 30 percent by weight of dispersed synthetically refined free silica ($SiO_2$). The bomb was then connected to a gas transfer system and evacuated at liquid nitrogen temperature, and was then charged with 25 grams of hexafluoropropene and 25 grams of vinylidene fluoride corresponding to a total monomer charge containing 30 mol percent of hexafluoropropene and 70 mol percent of vinylidene fluoride. The polymerization bomb was then closed and placed in a mechanical shaker. The polymerization reaction was carried out with constant shaking of the bomb in a constant temperature bath maintained at a temperature of 50° C. for a period of 22 hours under autogenous pressure. At the end of 22 hours the polymerization bomb was vented to atmospheric pressure and the unreacted monomers were removed. The polymer latex was coagulated by freezing in a Dry-Ice chest. The coagulated product was collected, washed thoroughly with hot water to remove residual salts and dried in vacuo at 35° C. A tough white elastomeric product was obtained in about an 88 percent conversion, and contains approximately 68 mol percent of combined vinylidene fluoride and 32 mol percent of combined hexafluoropropene. This raw copolymer product was found to have a tensile strength of 1700 pounds per square inch and a tear strength of 210 pounds per square inch.

(B) The copolymer produced in accordance with the procedure of part (A) of this example was vulcanized according to the procedure of part (B) of Example 1 above by admixing 100 parts of the raw copolymer with 10 parts of zinc oxide, 10 parts of Diphos and 1.5 parts of benzoyl peroxide. The resultant admixture was then placed in a press for ½ hour at 300° F. The pressed stock was then placed in an oven and heated at a temperature of 300° F. for a period of 16 hours. The vulcanized sample was a tough and snappy rubber having a tensile strength of 2200 pounds per square inch and a tear strength of 240 pounds per square inch.

Comparison of the tensile strengths of the products of Example 3(A) with Example 1(B) shows that the tensile strength (i.e. 1700 p.s.i.) of the raw unvulcanized copolymer of hexafluoropropene and vinylidene fluoride which is prepared in the presence of silica is greater than the tensile strength (1345 p.s.i.) of the vulcanized copolymer prepared in the absence of silica by about 26 percent.

Comparison of the results of Example 3(B) with Example 1(B) shows that the tensile strength (2200 p.s.i.) of the vulcanized copolymer of hexafluoropropene and vinylidene fluoride prepared in the presence of silica is greater by about 64 percent than the tensile strength (1345 p.s.i.) of the vulcanized copolymer prepared in the absence of silica.

Further comparison of the results of Example 3(B) with the results of Example 2 shows that the tensile strength (2200 p.s.i.) of the vulcanized copolymer prepared in the presence of silica is greater by about 30 percent than the tensile strength (1700 p.s.i.) of the copolymer which has been prepared in the absence of silica but which has been vulcanized in the presence of admixed silica.

It is to be noted that the vulcanization recipe employed in Examples 1(B), 2 and 3(B) were the same and that the weight percent of silica employed in Examples 2 and 3(A) were the same, that is, in Example 2 the amount of the silica admixed with the raw copolymer was 10 percent by weight and in Example 3(A) about 10 percent by weight of the silica based on total monomers charged was present during the polymerization reaction.

*Example 4*

After flushing a 300 ml. amino polymerization bomb with nitrogen, the following aqueous emulsion polymerization catalyst system was charged to the bomb after the addition of each ingredient:

(1) 15 ml. of water containing 3.0 grams of dissolved disodium hydrogen phosphate heptahydrate,
(2) 90 ml. of water containing 0.75 gram of 3,5,7,8-tetrachloroundecafluorooctanoic acid, and
(3) 45 ml. of water containing 0.75 gram of dissolved potassium persulfate.

The pH of the polymerization catalyst system was found to be about 7. The bomb was then connected to a gas transfer system and evacuated at liquid nitrogen temperature. The polymerization bomb was then charged with 30 grams of hexafluoropropene and 30 grams of vinylidene fluoride corresponding to a total monomer charge containing 30 mol percent of hexafluoropropene and 70 mol percent of vinylidene fluoride. The polymerization bomb was then closed and placed in a mechanical shaker. The polymerization reaction was carried out with constant shaking of the bomb at a constant temperature of 50° C. for a period of 22 hours under autogenous pressure. At the end of 22 hours the polymerization bomb was vented to atmospheric pressure and the unreacted monomers were removed. The polymer latex was coagulated by freezing it at solid carbon dioxide temperature. The coagulated product was collected, washed thoroughly with hot water to remove residual salts and dried in vacuo at 35° C. A tough white elastomeric product was obtained in about a 76 percent conversion. Upon analysis the product was shown to contain 31.27 percent carbon corresponding to 32 mol percent of combined hexafluoropropene and 68 mol percent of combined vinylidene fluoride or 50.2 weight percent of combined hexafluoropropene and 49.8 weight percent of combined vinylidene fluoride.

The copolymer produced by the procedure of this example was vulcanized by admixing 43.9 grams of the raw copolymer with 1.3 gram of benzoyl peroxide, 4.4 grams of disodium phosphite and 4.4 grams of zinc oxide. The resultant admixture was then placed in a press for one-half hour at a temperature of 230° F. and at a pressure of 15,000 pounds per square inch. The stock was then placed in an oven and heated at a temperature of 300° F. for a period of 16 hours. The vulcanized sample was a tough and snappy rubber having a tensile strength of 1500 pounds per square inch.

*Example 5*

The polymerization reaction of Example 4 above is repeated using the same technique, reaction conditions and the same polymerization recipe except that the 3,5,7,8-tetrachloroundecafluorooctanoic acid is dissolved in 70 cc. of water, and 20 cc. of a 30 percent by weight aqueous solution of finely dispersed free silica is added as an ingredient of the aqueous emulsion polymerization system. The elastomeric copolymer product is worked up in the same manner as described in Example 4 above and is then vulcanized under the same conditions as set forth in Example 4 above. In this reaction, however, the vulcanized copolymer has a tensile strength of the order of about 2300 pounds per square inch.

As indicated herein, in addition to the free silica employed in Examples 3 and 5 above, silica in combined form may be employed in place of or in addition to the free silica to obtain hexafluoropropene-vinylidene fluoride copolymers of improved tensile strength. Typical examples of such silicas are: (1) silicone coated silica available as LM-3, prepared by coating silica with a linear dimethyl siloxane polymer; and (2) esterified silica available as Valron Estersil which has a completely hydrophobic surface of 3 butoxy groups per square millimicron on a particle of mean ultimate diameter of 3–10 millimicrons. Copolymerization of hexafluoropropene and vinylidene fluoride in any of the polymerization catalyst systems described in the above examples in the presence of about 8 percent by weight, based on total monomers charged, of the aforesaid silicone coated silica LM-3 or esterified silica Valron Estersil instead of the free silica, leads to the production of polymer products of significantly greater tensile strength than polymer produced under the same reaction conditions but in the absence of the combined silica.

Various alterations and modifications of the products and process of this invention may become apparent to those skilled in the art without departing from the scope of this invention.

Having described my invention, I claim:

1. A process which comprises copolymerizing a monomer mixture of between about 5 and about 95 mol percent hexafluoropropene and between about 95 and about 5 mol percent of vinylidene fluoride in the presence of an aqueous polymerization catalyst system containing between about 2 and about 30 parts of a modified adsorptive silica per 100 parts of total monomer, said silica being modified with a saturated aliphatic alcohol having from 2 to about 18 carbon atoms, the particle size of said silica not exceeding 20 microns, to produce a copolymer of hexafluoropropene and vinylidene fluoride containing said silica and having a tensile strength of at least about 1500 p.s.i.

2. The product of the process of claim 1.

3. A process for preparing an elastomeric copolymer of hexafluoropropene and vinylidene fluoride with improved tensile strength, tear strength and degree of elongation which comprises copolymerizing a monomer mixture of between about 20 and about 70 mol percent of hexafluoropropene and correspondingly between about 80 and about 30 mol percent of vinylidene fluoride in the presence of an aqueous polymerization catalyst system containing between about 2 and about 30 parts of an unmodified adsorptive silica per 100 parts of total monomer, the particle size of said silica not exceeding 20 microns, to produce an elastomeric copolymer of hexafluoropropene and vinylidene fluoride containing said silica and having a tensile strength of at least about 1500 p.s.i.

4. The elastomeric product of the process of claim 3.

5. A process for preparing an elastomeric copolymer of hexafluoropropene and vinylidene fluoride with improved tensile strength, tear strength and degree of elongation which comprises copolymerizing a monomer mixture of about 30 mol percent hexafluoropropene and about 70 mol percent of vinylidene fluoride in the presence of an aqueous polymerization catalyst system containing between about 2 and about 30 parts of an unmodified adsorptive silica per 100 parts of total monomer, the particle size of said silica not exceeding 20 microns, to produce an elastomeric copolymer of hexafluoropropene and vinylidene fluoride containing said silica and having a tensile strength of at least about 1500 p.s.i.

6. The elastomeric product of the process of claim 5.

7. A process which comprises copolymerizing a monomer mixture of between about 5 and about 95 mol percent hexafluoropropene and between about 95 and about 5 mol percent of vinylidene fluoride in the presence of an aqueous polymerization catalyst system containing between about 2 and about 30 parts of an adsorptive silica per 100 parts of total monomer, said adsorptive silica being selected from the group consisting of modified and unmodified silica and having a particle size not exceeding 20 microns, to produce a copolymer of hexafluoropropene and vinylidene fluoride containing said adsorptive silica and having a tensile strength of at least about 1500 p.s.i.

References Cited in the file of this patent

UNITED STATES PATENTS

| | | |
|---|---|---|
| 2,689,241 | Dittman et al. | Sept. 14, 1954 |
| 2,705,706 | Dittman et al. | Apr. 5, 1955 |
| 2,728,740 | Iler | Dec. 27, 1955 |
| 2,847,391 | Wheeler | Aug. 12, 1958 |